(No Model.)
J. J. BURNAUGH.
HAY STACKING MACHINE.
No. 344,030. Patented June 22, 1886.
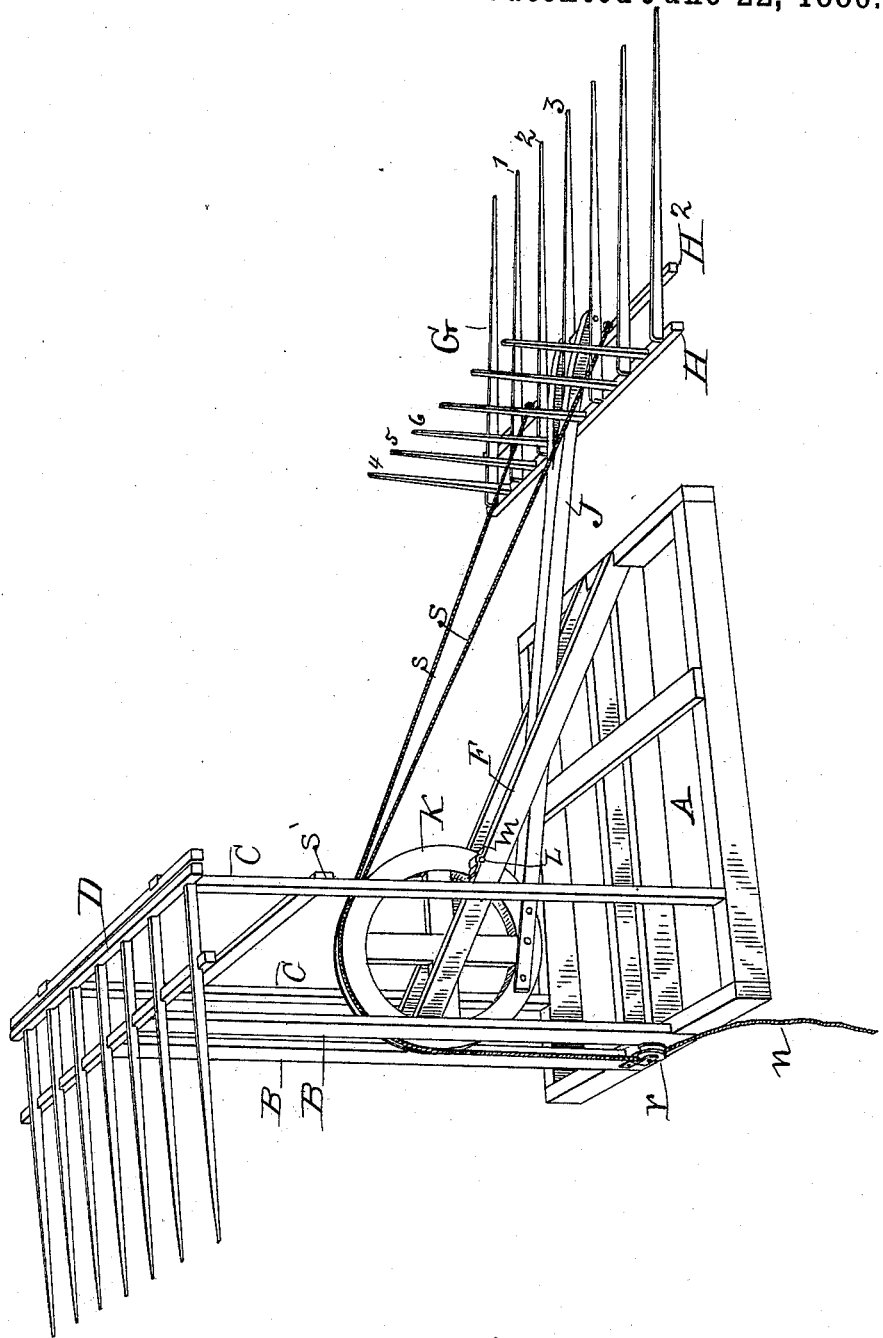
Witnesses:
M. F. Anderson,
C. M. Stiles
Inventor:
Joseph J. Burnaugh,
By Thomas G. Orwig, Att'y.
N. PETERS, Photo-Lithographer, Washington, D. C.

UNITED STATES PATENT OFFICE.

JOSEPH J. BURNAUGH, OF LIBERTYVILLE, IOWA.

HAY-STACKING MACHINE.

SPECIFICATION forming part of Letters Patent No. 344,030, dated June 22, 1886.

Application filed February 16, 1886. Serial No. 192,092. (No model.)

*To all whom it may concern:*

Be it known that I, JOSEPH J. BURNAUGH, a citizen of the United States of America, and a resident of Libertyville, in the county of Jefferson and State of Iowa, have invented a certain new and useful Improvement in Hay-Stacking Machines, of which the following is a specification.

My object is to save time, labor, and expense in stacking loose hay and straw and bound grain in the field; and my invention consists in the construction and combination of a derrick, a horse-power, and a fork, as hereinafter described and claimed, in such a manner that the fork can be placed flat upon the ground to receive a load, and then rapidly lifted into a vertical position by the movement of the horse-power to throw the contents over the top of the derrick, to be distributed and packed as required in building a stack.

In the accompanying drawing, which is a perspective view of my complete machine, A represents the base of the derrick. It is an oblong frame about five (5) feet wide and ten (10) feet long, and composed of wooden timbers, that may vary in size and numbers as desired, and be joined together by mortises and tenons and bolts and braces in any suitable way.

B B are parallel posts, about fourteen (14) feet long, fixed to the rear end and center of the base A, and close together.

C C are corresponding posts fixed to the sides and rear portions of the same base.

D represents a skeleton platform fixed to the tops of the derrick-posts B and C. This platform is preferably in the form of a rake, with the free and pointed ends of the teeth extending rearward, to allow hay or straw, &c., to slip off readily as it is thrown thereon from the swinging fork, as required to prevent matter from accumulating upon the platform. The teeth are framed or otherwise rigidly fixed to wooden cross-pieces, and the cross-pieces to the top of the derrick-posts B and C. This platform or shed is about six (6) feet long and corresponds in width with the length of the fork.

F F are timbers fixed in inclined and parallel positions, so as to extend from the front and center of the base A to the central portions of the parallel posts B, for the purpose of bracing the derrick and complete machine, and also to serve as a fulcrum for the fork-operating lever.

G represents a fork composed of a head, H, that may vary in size as desired, a series of straight and pointed teeth, 1 2 3, that are about sixteen inches apart and firmly fixed on the head, a brace, $H^2$, that extends parallel with the head, and a series of shorter teeth, 4 5 6, fixed to the head H, so as to project at right angles from the series of teeth 1 2 3, as clearly shown in the drawing, and as required to retain the hay in the fork as it is swung upward.

J represents a fork-handle, about eleven (11) feet long, fixed on top of the head H and brace $H^2$, and between the teeth, by means of screw-bolts, or in any suitable way.

K is a wheel, about six (6) feet in diameter and six inches thick, preferably made of hard wood and heavy enough to balance the weight of the fork, firmly fixed to the end of the fork-handle, and mounted upon the braces F by means of an axle, L, fixed in the rim of the wheel, and bearings $m$, fixed to the said braces.

$n$ represents a rope or chain fixed to the periphery of the wheel.

$r$ is a pulley attached to the rear edge of the base A, over which the rope $n$ is passed, so that a horse can be hitched to its free end to operate the fork.

$s$ $s$ are ropes or chains fixed to the wheel, and also to the fork, in such a manner that they will come in contact with the cross-bar $s'$, that is fixed to the post C, whenever the fork is thrown up, so as to restrict the motion of the fork relative to the derrick, as required, to prevent the fork from striking the derrick.

In the practical use of my machine I move it about upon a truck and place it aside of the spot where I wish to build a stack, and then by means of horse-rakes, or in any suitable way, drag hay, straw, or bound shocks of grain upon the fork when it is flat upon the ground to load the fork. To elevate and throw the load off the fork and over the platform of the derrick to a person there to build the stack, I simply advance a horse hitched to the end of the rope $n$, so that a quick forward motion of the horse will swing the fork upon its fulcrum. A backward motion of the horse allows the fork to return flat upon the ground again, so that the operation can be rapidly repeated and a stack expeditiously built without much manual labor.

I claim as my invention—

1. In a hay-stacking machine, the combination of a derrick having a platform projecting rearward from its top, a fork having a handle, a wheel at its end pivoted eccentrically to the derrick, and means for swinging the fork and wheel upon their fulcrum, in the manner set forth, for the purposes stated.

2. The base A, the derrick B C D, having a cross-bar, s', the brace and fulcrum F F, the horse-power consisting of the wheel K, fork-handle J, and a rope and pulley, the fork G, and the ropes s s, constructed, arranged, and combined to operate in the manner set forth, for the purposes specified.

3. A hay-stacking machine composed of the following-named elements, to wit: a base having derrick-posts fixed to its rear portion, a shed or platform fixed to the tops of the posts, to extend rearward from the posts, a horse-power consisting of a rope and pulley, a wheel, a fulcrum and brace fixed to the posts and the base, a fork consisting of a handle, and a head or frame having a series of long teeth extending forward, and a series of short teeth extending at right angles to the long teeth, and a device to prevent the fork from striking the derrick.

JOSEPH J. BURNAUGH.

Witnesses:
L. BURNAUGH,
H. L. JORDAN.